May 29, 1928.

R. T. MULLEN ET AL 1,671,482

STRAIN BALL TRIMMING MACHINE

Filed Sept. 2, 1926    4 Sheets-Sheet 3

WITNESSES:
E. A. McCloskey
W. D. O'Connor

INVENTORS
Richard T. Mullen and
Albert H. Kells.
BY
Chesley S. Carr
ATTORNEY

May 29, 1928. 1,671,482
R. T. MULLEN ET AL
STRAIN BALL TRIMMING MACHINE
Filed Sept. 2, 1926 4 Sheets-Sheet 4

WITNESSES:
E. G. McCloskey.
W. D. O'Connor

INVENTORS
Richard T. Mullen and
Albert Kells.
BY
Chesley G. Carr
ATTORNEY

Patented May 29, 1928.

1,671,482

UNITED STATES PATENT OFFICE.

RICHARD T. MULLEN, OF LATROBE, AND ALBERT C. KELLS, OF DERRY, PENNSYLVANIA, ASSIGNORS TO WESTINGHOUSE ELECTRIC AND MANUFACTURING COMPANY, A CORPORATION OF PENNSYLVANIA.

STRAIN-BALL TRIMMING MACHINE.

Application filed September 2, 1926. Serial No. 133,174.

Our invention relates to machinery for forming articles of porcelain or other clay or similar mixtures before said articles are fired or baked.

One object of our invention is to provide a continuous process for automatically and accurately trimming and shaping plastic material.

Another object of our invention is to provide a machine for successively trimming the ends of and stamping designs on ceramic articles before they are fired.

A further object of our invention is to provide a method of trimming plastic articles that comprises clamping the articles in a revoluble chuck and performing a series of operations thereon at different positions of the chuck.

The machine embodying our invention comprises, in general, a chuck adapted to receive plastic articles, such as partially dried strain ball insulators, in a plurality of positions, and trimming and stamping means mounted to register with such positions.

Figure 1:
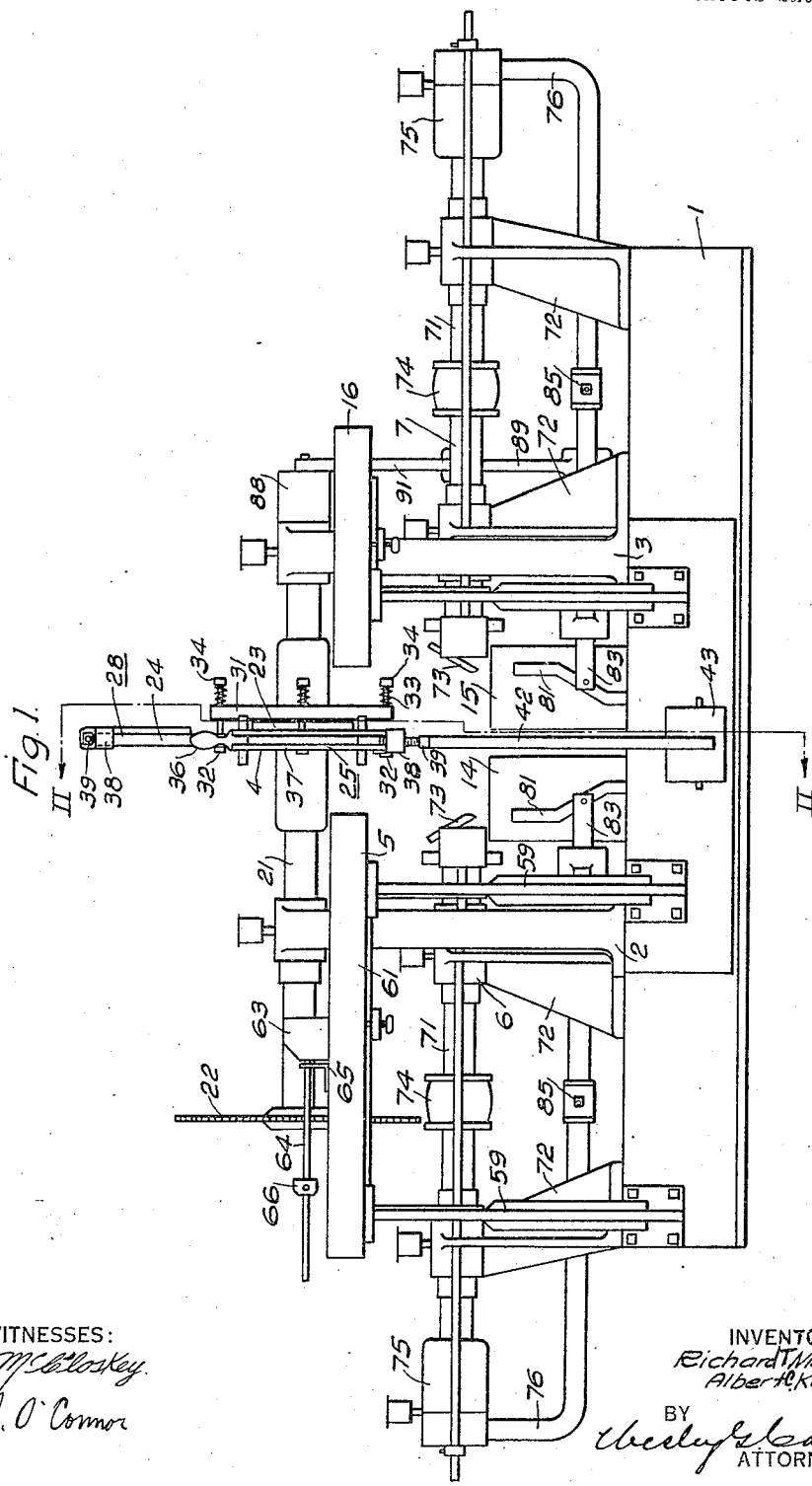
Figure 2:
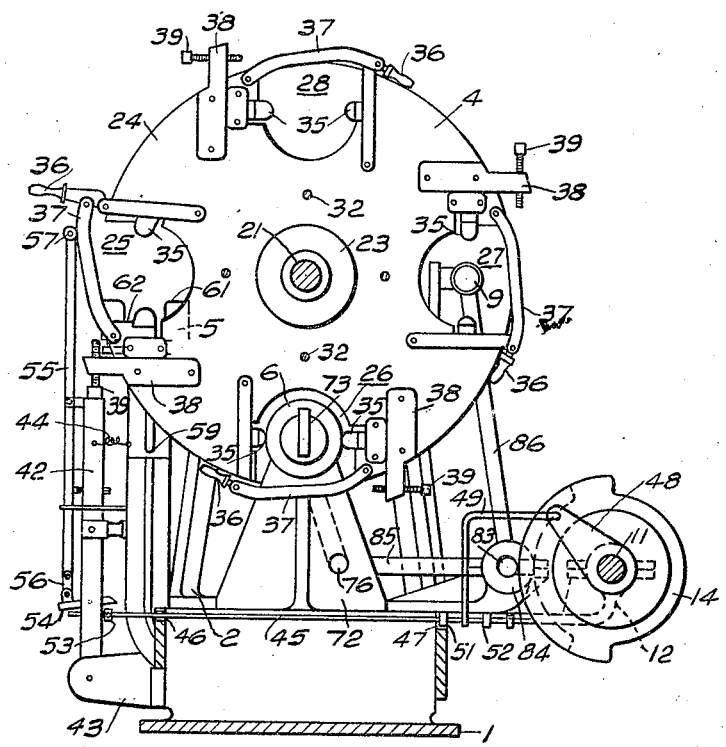
Figure 3:
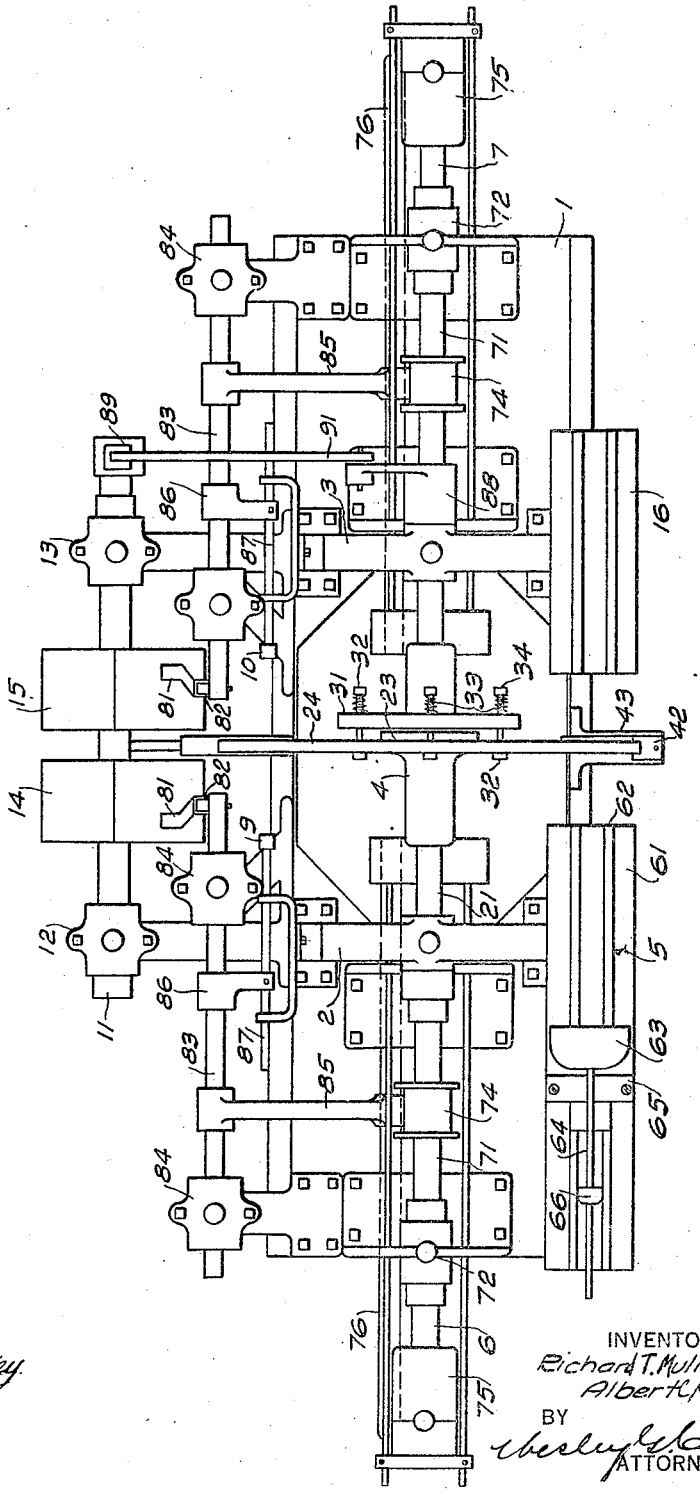
Figure 4:
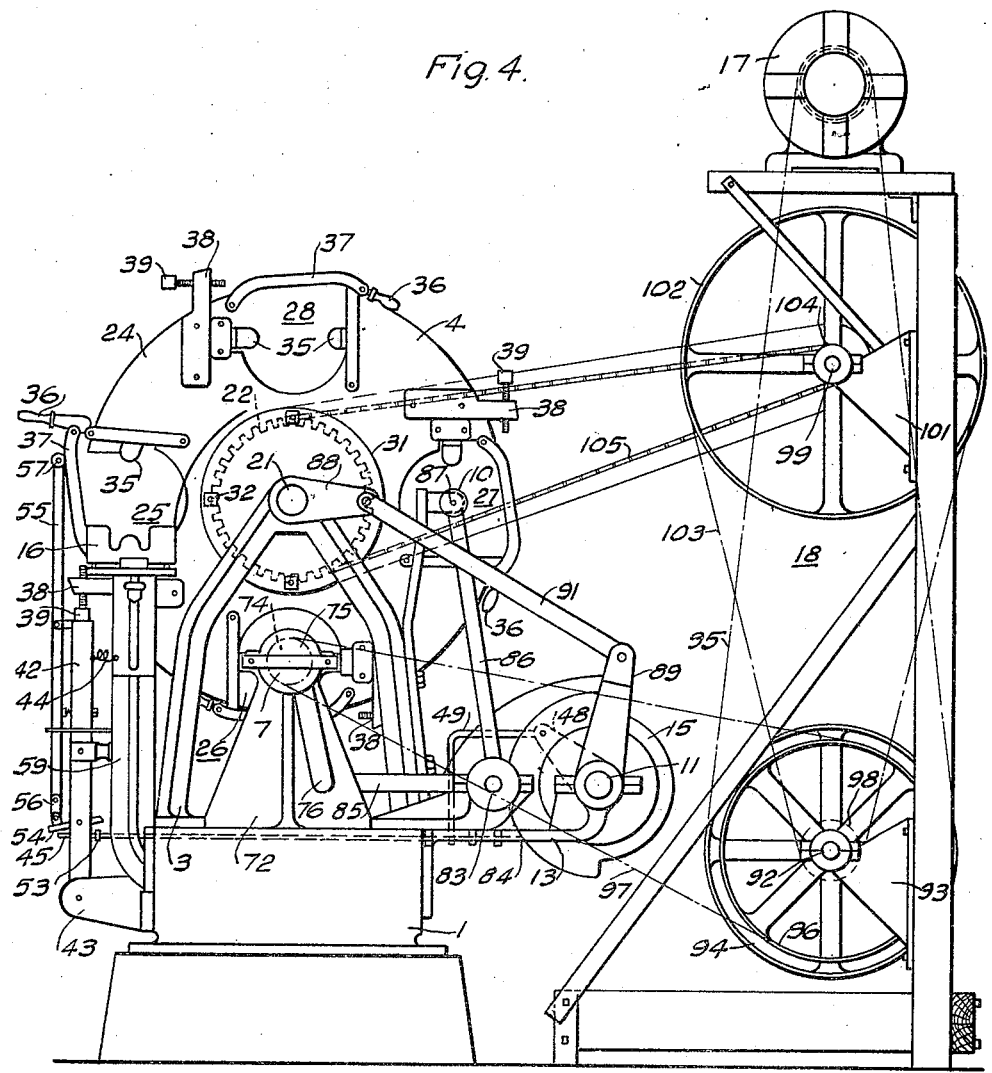

The chuck is so mounted that it may be revolved to bring the articles to be trimmed successively into a position to be engaged by the trimming means and the stamping means. Our invention, however, may best be understood by referring to the accompanying drawings, wherein, Fig. 1 is a view in side elevation of a trimming machine embodying our invention, Fig. 2 is a view in vertical section taken on the line II—II of Fig. 1, Fig. 3 is a plan view of the trimming machine, and Fig. 4 is a view in end elevation of the trimming machine and driving mechanism.

Referring to the drawings, the trimming machine embodying our invention comprises, in general, a base 1 that has bearing brackets 2 and 3 mounted thereon for revolubly supporting a chuck 4. A loading way or stand 5 is supported from the base 1 and serves to guide the untrimmed plastic articles into the proper position for clamping them in the chuck 4. Trimming mechanisms 6 and 7 are also mounted on the base 1 in a position to trim the plastic articles in the chuck 4. Stamps 9 and 10 are supported from the bearing brackets 2 and 3 in the proper position to act upon the ends of a plastic article held in the chuck 4.

A cam shaft 11 is mounted in bearing brackets 12 and 13 that are secured to the base 1 and supports cams 14 and 15, which serve to move the trimmer mechanisms 6 and 7 and the stamps 9 and 10 into engagement with plastic articles in the chuck 4. A receiving stand 16 is mounted level with the loading stand 5 and at the other side of the chuck 4 for receiving the finished articles as they are pushed out of the chuck. A motor 17 furnishes power to drive the machine by means of a driving mechanism 18.

The chuck mechanism 4 comprises a shaft 21 and is journalled in the bearing pedestals 2 and 3 and is provided, at one end, with a sprocket wheel 22 by means of which the chuck mechanism 4 is driven, as will be hereinafter explained. The shaft 21 has a friction disc 23 secured at substantially its mid portion. A chuck plate 24, having clamps 25, 26, 27, and 28 equally spaced around its outer edge, is journalled upon the shaft 21 adjacent to the disc 23. A plate 31 is also journalled on the shaft 21 adjacent to the disc 23 on the side thereof opposite to that occupied by the plate 24 and is secured to the latter by means of bolts 32. Springs 33 are provided between the heads 34 of the bolts 32 and the plate 31 for biasing the plate 31 towards the plate 24 and thereby setting up frictional contact between the disc 23 and the plates 24 and 31. The clamps 25, 26, 27 and 28 comprise clamping fingers 35 and operating levers 36 that act upon the clamping fingers 35 in conjunction with the links 37.

At each clamp is secured a projecting catch or lug 38 having an adjusting screw 39. A stop member or latch 42 is pivoted to a bracket 43 that is mounted on the base 1 in such manner that it engages the lugs 38 on the chuck 4 and serves to stop the rotation thereof at a predetermined position. A spring 44 serves to bias the latch into engagement with the lugs 38, and a push rod 45, that extends through openings 46 and 47 in the base 1, serves to move the latch 42 out of engagement with the lugs 38. The push rod 45 is operated from the cam shaft 11 by a crank arm 48 through a link 49 that slides upon the rod 45 and engages collars 51 and 52 thereon. The push rod 45 acts upon the latch 42 by the engagement of a collar 53 on the rod 45 with a sear 54 that is pivoted on the latch 42. A trigger 55 is also pivoted on the latch 42 and is connected to the sear 54 by means of a link 56. The trigger 55 is provided, at its upper end, with a roller 57 that bears against the link 37 on the chuck 4.

The loading stand 5 comprises a feeding way 61 having grooves 62 for receiving projections on the plastic articles to be trimmed, the feeding way being supported by brackets 59 from the base 1. A feeding block 63 is slidably mounted upon the way 61 by means of a rod 64 that extends through a bracket 65. The rod 64 has a stop 66 secured thereto that is adapted to engage the bracket 65 and thereby limit the motion of the feeding block 63.

The cutter mechanisms 6 and 7 comprise shafts 71 that are slidably journalled in bearing pedestals 72 which are secured to the base 1. Trimming knives 73 are mounted on the ends of the shafts 71 adjacent to the chuck 4, and driving pulleys 74 are secured to the shaft 71 between the bearing pedestals 72. Thrust bearings 75 are mounted on the ends of the shafts 71 opposite to the ends occupied by the trimming knives 73. Trimmer-actuating arms 76 are secured to the thrust bearings 75 and are slidably supported in the pedestals 72 below the shafts 71.

The cams 14 and 15 are provided with grooves 81 that cooperate with cam rollers 82 on the ends of cam rods 83. The cam rods 83 are slidably mounted on brackets 84 and are secured to the cutter-actuating rods 76 by means of arms 85. Arms 86, that are also mounted on the cam rod 83, are secured to rods 87 upon which the stamps 9 and 10 are mounted.

The cam shaft 11 is driven by a crank 88 on the end of the chuck shaft 21 that actuates an arm 89 on the cam shaft 11 by means of a connecting rod 91. The arm 89 has a longer operating radius than the crank 88. Because of this difference in radius, the cam shaft 11 is caused to oscillate through approximately one-half of a revolution for each complete revolution of the chuck shaft 21.

Referring to Fig. 4, the driving mechanism 18 comprises a shaft 92 journalled in wall brackets 93 and has a pulley 94 mounted thereon which is driven by the motor 17 by means of a belt 95. Pulleys 96, also mounted on the shaft 92, drive the cutter shafts 71 by means of belts 97 that engage the pulleys 74. A pulley 98 of small diameter is also mounted on the shaft 92 and serves to drive a shaft 99. The shaft 99 is journalled in wall brackets 101, substantially parallel to, and above, the shaft 92, and has mounted thereon a belt pulley 102 that receives power from the pulley 98 on the shaft 92 by means of a belt 103. A small sprocket wheel 104 is also mounted on the shaft 99 and is connected to the sprocket wheel 22 on the chuck shaft 21 by means of a chain 105.

Starting with the machine in the position shown in Fig. 4, the operation of the device is as follows:

The motor 17, when energized, drives the shafts 92 and 99 and the cutter shafts 71 by means of the belt and pulleys as heretofore explained. The shaft 99 drives the chuck shaft 21 at a substantially constant speed and causes the cam shaft 11 to oscillate. However, the chuck plate 24 is restrained from turning because of the engagement of the latch 42 with the lug 38. The disc 23, therefore, rotates between the chuck plate 24 and the clutch plate 31.

The plastic article to be trimmed is placed upon the feed stand 61 and pushed into the proper position in the clamp 25 by means of the feeding block 63. The clamp 25 is then closed by turning the lever 36 and, therefore, the link 37 clockwise. This movement of the link 37 allows the trigger 55 to turn clockwise and the sear 54 to engage the collar 53 on the push rod 55. At the proper point in the cycle of operations, the arm 48 moves the push rod 45 to the left, as seen in Fig. 2, by the engagement of the link 49 with the collar 51. The push rod 45 turns the latch 42 counter-clockwise by reason of the engagement of the collar 53 with the sear 54.

The movement of the latch 42 allows it to become disengaged from the lug 38, thereby releasing the chuck plate 24, which is then revolved with the shaft 21 by means of the frictional engagement of the disc 23 with the chuck plate 24 and the clutch plate 31. As the chuck 4 is rotated, the push rod 45 is moved to the right, as seen in Fig. 2, thus allowing the latch 42 to turn clockwise into a position to engage the lug 38 on the clamp 28, thereby stopping the rotation of the chuck plate 24 after it has made approximately one-quarter of a revolution and turned the clamp 28 into the proper position to receive a plastic article to be trimmed.

The clamp 25 and the first plastic article to be trimmed then register with the trimming knives 73.

As the cam shaft 11 oscillates through its cycle, the cam grooves 81 engage the rollers 82 and cause the cam rods 83 to slide within the brackets 84. This sliding motion is transmitted to the cutter shafts 71 by means of the arms 85, and the knives 73 are, therefore, brought into engagement with the plastic article in the clamp 25. As the knives 73 are withdrawn from the plastic article, the latch 42 is again disengaged from the lug 38, and the chuck 4 is permitted to revolve to bring the clamp 25 into position to register with the stamps 9 and 10, as heretofore explained. The clamp 27 is then in position to receive another article to be trimmed, and the clamp 28 registers with the trimming knives 73. As the cam shaft 11 again passes through its cycle, it moves the stamps 9 and 10 into engagement with the plastic article in the clamp 25 by means of the arms 86 and the rods 87. Simultaneously, the trimming knives 73 are brought into engagement with the second plastic article in the clamp 28. The cutting knives and stamps are then withdrawn, the latch 42 disengaged from the lug 38 and the cycle again repeated. As the plastic articles to be trimmed are pushed into the clamps in the chuck 4, the finished articles are pushed out onto the receiving stand 16, from which they may be removed at will.

It will be evident from the foregoing description that a machine constructed in accordance with our invention is adapted to expeditiously and accurately trim the ends of, and stamp designs on, plastic articles.

Although we have described a specific embodiment of our invention it will be obvious to those skilled in the art that various modifications may be made in the details of the design and construction of the apparatus without departing from the spirit and scope of the invention, as set forth in the appended claims.

We claim as our invention:

1. A machine for working ceramic material comprising a base piece, a chuck shaft parallel to the base, a chuck plate mounted on the shaft, said chuck plate having a plurality of clamping means for securing plastic articles, and a friction clutch for connecting the chuck plate to the shaft.

2. A machine for working plastic material comprising a base piece, a chuck shaft parallel to the base, a chuck plate mounted on the shaft, said chuck plate having a plurality of clamping means for securing plastic articles, and a friction clutch for connecting the chuck plate to the shaft, trimmer shafts parallel to the chuck shaft, trimming members mounted on said trimmer shafts and means for moving the trimming members into engagement with the plastic articles.

3. In a machine for trimming strain ball or other insulators, the combination with a revoluble chuck having a plurality of clamping members for receiving the insulators to be trimmed, of rotatable trimming means, stamping means and means for bringing the trimming means and the stamping means into contact with said insulators.

4. A machine for working plastic material comprising a base piece, a chuck shaft parallel to the base, a chuck plate having means for clamping plastic articles mounted on the chuck shaft, trimmer shafts parallel to the chuck shaft, trimming members mounted on said trimmer shafts, and a cam shaft having cams thereon for moving the trimming members into engagement with the plastic articles.

5. In a machine for trimming strain ball insulators or similar articles in the unfired state, a revoluble chuck plate, a plurality of clamps in the chuck for receiving the articles to be trimmed, a loading stand, trimming knives and stamping members so positioned that they simultaneously register with clamps in the chuck.

6. In a machine for trimming insulators, a chuck having four positions for receiving insulators to be trimmed, means for revolving the chuck, stop members for limiting the continuous movement of the chuck to substantially one-fourth of a revolution, rotatable trimming means for engaging the ends of the insulators at one stop position and stamping means for engaging said insulators at another stop position.

7. In a machine for trimming insulators, a chuck having four positions for receiving insulators to be trimmed, means for revolving the chuck, stop members for limiting the continuous movement of the chuck to substantially one-fourth of a revolution, a loading stand, rotatable trimming knives and stamps registering with three insulator-receiving positions simultaneously.

8. A machine for trimming the ends of strain ball insulators that comprises a base member, a shaft mounted on the base member, a chuck plate mounted on the shaft, a plurality of positions on the chuck plate for receiving the insulators to be trimmed, a friction clutch for driving the chuck plate and a stop mechanism for periodically stopping the chuck plate at predetermined positions.

In testimony whereof, we have hereunto subscribed our names this 11 day of August, 1926.

R. T. MULLEN.
ALBERT C. KELLS.